3,406,053
ADHESIVE COMPOSITION
Virgil W. Jaenicke, Costa Mesa, Calif., assignor to Whittaker Corporation, Los Angeles, Calif., a corporation of California
No Drawing. Filed June 1, 1964, Ser. No. 371,807
4 Claims. (Cl. 156—309)

ABSTRACT OF THE DISCLOSURE

This patent describes an unsupported adhesive film having disbursed therein finely divided particles which are substantially inert to the adhesive and substantially stable at the curing temperature of the adhesive. The particulate material is present in an amount and size sufficient to permit a bond line having a thickness of at least one mil to be obtained when the adhesive is used to bond two or more members. This patent also described a bonding process wherein the unsupported adhesive film is interposed between two members to be bonded and the members and adhesive film are subjected to sufficient heat and pressure to cure the adhesive.

---

The present invention relates to adhesive compositions and more particularly to unsupported adhesive film compositions containing inert particles. The inert particles present in the adhesive coomposition of the present invention function to control the bond line thickness of joints made with the adhesive composition.

It has long been a severe problem in the lamination and similar arts to control the bond line thickness of joints prepared with unsupported film adhesives because of the difficulty in controlling the flow characteristics of the adhesive. This has been a particularly acute problem with regard to adhesives which must be cured at elevated temperatures under substantial pressures. In those instances where inadequate bonding has been obtained with a given adhesive, prior art workers have utilized woven or unwoven fabric carriers comprising various types of fibers. However, film adhesives supported by carriers such as fabrics cannot normally be produced by film casting or calendering techniques and must be solution or hot melt coated. For some adhesive formulations, solution and/or hot melt coating techniques are not practical or usable production methods. Thus, it has often been necessary to use unsupported film adhesives.

The thickness of the finished bond line obtained when unsupported film adhesives are used can be controlled only by controlling flow properties of the formulation under the required conditions of temperature and pressure necessary to effect the cure of the adhesive film which will pass through a fluid phase during the curing cycle. However, certain otherwise highly desirable adhesive formulations such as nylon-epoxy compositions, have high flow rates under the required curing conditions and yield very thin bond lines having inferior strengths and a greatly reduced capability to adequately bond members which do not meet to precise tolerances. Thus, uncertainties with regard to the adequacy of the bond strength in the different areas of complex structural bonded components often occur when such unsupported adhesives are used.

It is a primary object of the present invention to provide a process and adhesive composition suitable for producing bond lines having a predetermined controlled thickness.

It is another object of the present invention to provide a composition comprising an unsupported film adhesive containing inert particles which are selected so as to control the thickness of the bond line which will be obtained when the adhesive is used to bond two or more members and the process of using this adhesive.

Other objects and advantages of the present invention, it is believed, will be apparent from the following description of preferred embodiments thereof.

Briefly, the present invention comprehends an adhesive composition comprising an unsupported adhesive film having dispersed therein particles of a material which has suitable melting point and deformation properties to resist excessive deformation under the curing conditions to which the adhesive film will be subjected during cure. By appropriate selection of the particle composition, size and amount, the finished bond line thickness can be controlled under any given conditions of cure temperature and pressure. In cast film adhesive formulations, the selected particles are dispersed uniformly in the adhesive solution by mixing prior to casting of the film. Unsupported film adhesives containing appropriate particles may also be produced by calendering or milling processes.

The composition of the particles used in the adhesive compositions of the present invention will, of course, depend upon the composition of the adhesive itself. The particulate material should be substantially inert to the adhesive material, substantially dimensionally stable under the conditions of temperature required to cure the adhesive and have substantially no deleterious effect on the bonding properties of the adhesive. Among the materials which the particulate material may comprise are glass, organic polymers, ceramics, wood, metals and silica-containing materials. Once the composition of the particulate material has been selected for a given adhesive composition, it remains only to select an appropriate particle size and concentration to produce the desired bond line thickness.

While the composition of the present invention is not to be limited to particulate material of any particular size, it has been found that in many instances, sizes which will produce a bond line thickness of at least about 1 mil and preferably in the range of from about 1 to about 12 mils result in highly efficient bonds being obtained.

The present invention is applicable to any adhesive materials which may be produced in the form of unsupported films. For example, nylon-epoxy adhesives, polyurethane adhesives, polyester adhesives, phenol-aldehyde condensation product adhesives, epoxy adhesives, polybenzimidazole adhesives, proteinaceous adhesives and the like may be used.

Example

The following formulation was prepared:

| | |
|---|---|
| Polyamide (Zytel 61 nylon) _____lbs__ | 7.7 |
| Epoxy resin (Dow DER 331) _____lbs__ | 1.96 |
| Dicyandiamide _____grams__ | 53 |
| Ethanol _____lbs__ | 11.5 |
| MEK yellow dye _____grams__ | 3 |
| Polyamide particles (80 mesh Zytel 33 nylon) _____grams__ | 71.3 |

Zytel 61 nylon comprises an ethyl alcohol/water mixture-soluble nylon polyamide formed from the reaction of hexamethylenedianmonium adipate and hexamethylenedianmonium sebacate with caprolactam. Dow DER 331 is a polyglycidyl ether of bisphenol-A (para,para'-isopropylidenediphenol) having an epoxy equivalent of from about 186 to 192. Zytel 33 nylon is of the Nylon 6–6 type and refers to the nylon resulting from the reaction of hexamethylenediamine with adipic acid.

The volume concentration of the nylon particles in this composition based on the volume of the combined polyamide-epoxy resin was 1.6%. This composition was used to bond pairs of aluminum and steel sheets having dimensions of from ½" to 4" by from 8" to 10". The adhesive composition was first formed into an unsupported film having dimensions of 18" by 50 yards and was cut to appropriate size and then interposed between the metal sheets to be bonded. A curing pressure of 40 p.s.i. and temperature of 325° F. was then applied. A highly efficient bond having a bond line thickness in excess of 1 mil was obtained.

The amount of stress applied to the polyamide particles during curing may be readily calculated by dividing the pressure applied by the fraction of the volume composed of particulate material, namely 0.016, to give an average stress of 2500 p.s.i. Since the modulus of elasticity of Zytel 33 is approximately 250,000 p.s.i., the calculated stress of 2500 p.s.i. would produce a deflection of approximately 1% for square particles. Considering that at the curing temperature of 325° F. the particles would soften somewhat, a strain of no more than 100% would be encountered. Thus, the particulate material, originally having an average particle size of 6 to 7 mils, would be deflected no more than 3 mils during the application of the bonding pressure of 40 p.s.i. When it is considered that the nylon-epoxy adhesive would itself support some of the bonding pressure, the actual deflection of the particles may safely be assumed to be even less than 3 mils.

Among the other organic materials which could be used as particles in the process of the present invention are polytetrafluoroethylene and cross-linked polymers such as cross-linked phenolic resin or epoxy resins ground to an appropriate particle size and incorporated into the adhesives in an amount suitable to produce the desired glue line thickness.

Although the present invention is not to be considered to be limited to any particular theory of operation, it is contemplated that the particulate material present in the adhesive composition of the present invention performs a shimming function which prevents undesirable flow-out of the adhesive and maintains adequate separation between the members to be bonded.

I claim:
1. A bonding process comprising interposing an unsupported preformed adhesive film comprising a polyamide-epoxy adhesive capable of being cured by heat and pressure having dispersed therein finely divided particles which are inert to said adhesive and substantially dimensionally stable at the curing temperature of said adhesive between two metal members to be bonded, subjecting said members and said adhesive film to sufficient heat and pressure to cure the adhesive, said particles being present in a sufficient size and volume to function as shims between said metal members and thereby cause a bond line thickness of at least 1 mil to be obtained.

2. A bonding process comprising interposing an unsupported preformed film comprising a polyamide-epoxy resin adhesive having dispersed therein finely divided particles of 6, 6-polyamide between two metal members to be bonded, said polyamide particles having a melting temperature of at least about 400° F., and subjecting said members and said adhesive film to a temperature of about 325° F. and a pressure of about 40 p.s.i. to cure said adhesive, said particles being present in a sufficient size and volume to function as shims between said metal members and thereby produce a bond line having a thickness of at least about 1 mil.

3. The process of claim 2 wherein said particles have a size of from about 6 to about 7 mils.

4. The process of claim 2 wherein said particles are present in a volume concentration of about 1.6%, based on the volume of said polyamide-epoxy adhesive.

References Cited

UNITED STATES PATENTS

| | | | |
|---|---|---|---|
| 2,682,515 | 6/1954 | Naps | 260—37 X |
| 2,724,675 | 11/1955 | Williams | 156—309 X |
| 3,261,882 | 7/1966 | Gorton | 161—186 X |
| 3,284,398 | 11/1966 | Warren et al. | 260—37 X |
| 3,288,664 | 11/1966 | Hoppe | 156—310 |

FOREIGN PATENTS 819,718   9/1959   Great Britain.

EARL M. BERGERT, *Primary Examiner.*

D. J. FRITSCH, *Assistant Examiner.*